(12) United States Patent
Moesle et al.

(10) Patent No.: US 9,721,171 B2
(45) Date of Patent: Aug. 1, 2017

(54) METHOD AND DEVICE FOR DETECTING VARIABLE MESSAGE TRAFFIC SIGNS

(71) Applicant: Robert Bosch GmbH, Stuttgart (DE)

(72) Inventors: Frank Moesle, Stuttgart (DE); Daniela Weiss, Hildesheim (DE); Paul Ruhnau, Leonberg-Hoefingen (DE); Dimitrios Bariamis, Hildesheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/646,101

(22) PCT Filed: Nov. 20, 2013

(86) PCT No.: PCT/EP2013/074222
§ 371 (c)(1),
(2) Date: May 20, 2015

(87) PCT Pub. No.: WO2014/079852
PCT Pub. Date: May 30, 2014

(65) Prior Publication Data
US 2015/0302262 A1    Oct. 22, 2015

(30) Foreign Application Priority Data
Nov. 20, 2012  (DE) .................. 10 2012 221 159

(51) Int. Cl.
*G06K 9/00* (2006.01)
*G08G 1/0962* (2006.01)
(Continued)

(52) U.S. Cl.
CPC ..... *G06K 9/00818* (2013.01); *G06K 9/00825* (2013.01); *G06K 9/2027* (2013.01);
(Continued)

(58) Field of Classification Search
None
See application file for complete search history.

(56) References Cited

U.S. PATENT DOCUMENTS

| | | | |
|---|---|---|---|
| 9,305,224 B1 * | 4/2016 | Chen | .................. G06K 9/00825 |
| 2005/0123173 A1 * | 6/2005 | Isaji | ........................ G08G 1/166 |
| | | | 382/104 |

(Continued)

FOREIGN PATENT DOCUMENTS

| | | |
|---|---|---|
| CN | 101023436 A | 8/2007 |
| CN | 101630444 A | 1/2010 |

(Continued)

OTHER PUBLICATIONS

Koukoumidis et al. "SignalGuru: leveraging mobile phones for collaborative traffic signal schedule advisory", 2011, In Proceedings of the 9th international conference on Mobile systems, applications, and services (MobiSys '11), ACM, 127-140.*

(Continued)

*Primary Examiner* — Jason Heidemann
(74) *Attorney, Agent, or Firm* — Norton Rose Fulbright US LLP

(57) ABSTRACT

A method for detecting variable message traffic signs for a vehicle, includes: reading in a vehicle position, comparing the vehicle position to position information of at least one variable message traffic sign in order to determine a presence of a variable message traffic sign in a predefined area around the vehicle and in response to provide a proximity information, and varying a detection instruction of information of a variable message traffic sign in response to the proximity information to detect a variable message traffic sign.

11 Claims, 2 Drawing Sheets

(51) Int. Cl.
*G06K 9/20* (2006.01)
*G06T 7/70* (2017.01)

(52) U.S. Cl.
CPC ........... *G06T 7/70* (2017.01); *G08G 1/09623* (2013.01); *G08G 1/09626* (2013.01); *G06T 2207/10004* (2013.01); *G06T 2207/10144* (2013.01); *G06T 2207/30252* (2013.01)

(56) References Cited

U.S. PATENT DOCUMENTS

| | | | | |
|---|---|---|---|---|
| 2007/0242337 | A1* | 10/2007 | Bradley | B60Q 1/0017 359/237 |
| 2007/0242338 | A1* | 10/2007 | Bradley | B60Q 1/0017 359/237 |
| 2008/0122607 | A1* | 5/2008 | Bradley | B60Q 1/0017 340/468 |
| 2009/0135271 | A1* | 5/2009 | Kurane | H04N 5/2354 348/222.1 |
| 2009/0309972 | A1* | 12/2009 | Tonokawa | B60R 1/00 348/148 |
| 2010/0004856 | A1* | 1/2010 | Kobori | G01S 19/48 701/532 |
| 2010/0172542 | A1* | 7/2010 | Stein | G06K 9/00798 382/103 |
| 2011/0210867 | A1* | 9/2011 | Benedikt | G08G 1/01 340/905 |
| 2012/0233841 | A1* | 9/2012 | Stein | G03B 17/02 29/428 |
| 2012/0320204 | A1 | 12/2012 | Dahlin | |
| 2013/0038754 | A1* | 2/2013 | Watarai | H04N 5/77 348/231.3 |
| 2014/0098997 | A1* | 4/2014 | Faber | G06K 9/00825 382/103 |
| 2014/0132769 | A1* | 5/2014 | Kido | G06K 9/00791 348/148 |
| 2015/0138324 | A1* | 5/2015 | Shirai | B60Q 1/143 348/47 |
| 2015/0186734 | A1* | 7/2015 | Nakagawa | G06K 9/00791 382/104 |
| 2015/0302262 | A1* | 10/2015 | Moesle | G06K 9/00825 382/103 |
| 2015/0304539 | A1* | 10/2015 | Kristensen | H04N 5/2353 348/148 |

FOREIGN PATENT DOCUMENTS

| | | |
|---|---|---|
| CN | 201859542 U | 6/2011 |
| CN | 102376166 A | 3/2012 |
| DE | 10 2008 02385 | 12/2009 |
| DE | 10 2012 20172 | 8/2012 |
| FR | 2 968 817 | 6/2012 |
| JP | 2003-123197 A | 4/2003 |
| WO | 03/058585 A1 | 7/2003 |

OTHER PUBLICATIONS

Levinson et al., Traffic Light Mapping, Localization, and State Detection for Autonomous Vehicles, May 9-13, 2011, IEEE, 5784-5791.*

Fairfield et al. "Traffic Light Mapping and Detection", 2011, Proceedings of ICRA 2011.*

* cited by examiner

METHOD AND DEVICE FOR DETECTING VARIABLE MESSAGE TRAFFIC SIGNS

FIELD OF THE INVENTION

The present invention relates to a method for detecting variable message traffic signs for a vehicle, to a corresponding device for detecting variable message traffic signs as well as to a corresponding computer program product.

BACKGROUND INFORMATION

In the area of driver assistance systems, video sensor technology is used in vehicles, among other things, for detecting traffic signs. The results of the detection are normally reconciled or combined with information from the digital map of the navigation device before being displayed to the driver. In addition to normal sheet metal traffic signs, variable message traffic signs (light signals) must also be detected, among other things. Their detection frequently presents problems due to the pulsing of the LED lamps used. The frequency of the pulsing is not perceptible to the human eye. Depending on the exposure time, the pulsing frequency of the signs and the image recording frequency of the camera, however, the "off phase" of the pulsing may also fall into the image recording period, as a result of which the sign may not be detectable completely in the image or not at all. In the most unfavorable case, this occurs over the entire period in which the sign is within the detecting range of the camera. Normally, one tries to counter this problem with appropriately long exposure times, multiple exposures or registering multiple successive images.

Patent document DE 10 2008 023 853 A1 discusses a method for detecting an object, in which at least one light source of the object illuminates in a pulsed manner and the light emitted by the light source is detectable by a detector unit and the object is detected as a function of the detection of the light, a multiple exposure being performed for detecting the light of the light source in order for the detector unit to produce an image and the entire time duration of an exposure process comprising multiple exposures being set to be greater than the time duration of an off phase of the light source during a period duration of the light of the light source that is emitted in a pulsed manner. Furthermore, a system, in particular a driver assistance system, for detecting variable message traffic signs is also described.

SUMMARY OF THE INVENTION

Against this background, the present invention provides a method for detecting variable message traffic signs for a vehicle, furthermore a device for detecting variable message traffic signs for a vehicle that uses this method, and finally a corresponding computer program product as recited in the main claims. Advantageous refinements derive from the respective dependent claims and from the following description.

Variable message traffic signs may require an increased effort of detection in comparison to the detection of other types of traffic signs. Yet, variable message traffic signs represent only a small portion of the traffic signs to be detected. An efficient use of the existing resources may be achieved if the methods or parameterization used for detecting variable message traffic signs are carried out specifically when a variable message traffic sign is expected. For this purpose, use may be made of the fact that the (geographic) position of variable message traffic signs is often known.

A method for detecting variable message traffic signs for a vehicle is presented, the method including the following steps:

reading in a vehicle position;
comparing the vehicle position to a position information of at least one variable message traffic sign in order to determine a presence of a variable message traffic sign in a predefined area around the vehicle and in response to provide proximity information; and
varying an instruction for detecting information of a variable message traffic sign in response to the proximity information in order to detect the variable message traffic sign.

The method for detecting variable message traffic signs may be performed in a vehicle. The vehicle may be a motor vehicle such as a passenger car, a commercial vehicle and/or a motorcycle. A vehicle position may be understood as information about a geographic location, a position and/or a direction of movement of the vehicle. A vehicle position may be ascertained using a sensor system such as for example a satellite positioning device or receiver and/or an evaluation device. The vehicle position may be determined in response to satellite signals such as GPS or Galileo and/or in response to communication signals such as GSM, UMTS, LTE and/or WLAN, for example. The vehicle position may be determined in response to driving dynamics sensors. A variable message traffic sign, also abbreviated as VMS, may be understood as a special form of a traffic sign. A variable message traffic sign may indicate dynamically different sign combinations. A variable message traffic sign, specifically intended for the dynamic representation of traffic signs, may also be understood as a variable message direction sign. A variable message traffic sign may be configured as a mechanical variable message traffic sign and/or as a light-emitting variable message traffic sign. In the case of the latter, the display of the variable message traffic sign may be achieved by a plurality of light sources such as LEDs for example. The light sources may be controlled in a pulsed manner. Position information may be associated with a variable message traffic sign. The position information may include the geographic position and/or the orientation in relation to a direction of travel and/or the elevation above a traffic lane. The predefined area around the vehicle may include a geographic area in front of the vehicle position in the direction of travel, for example an area from 10 to 100 meters.

The predefined area may include essentially a circular and/or rectangular and/or triangular geographic area around and/or in front of the vehicle position in the direction of travel. If at least one variable message traffic sign was identified in the predefined area around the vehicle, then proximity information may be provided in response to this identification. The proximity information may be provided as a signal. The proximity information may provide an indication of a variable message traffic sign in the predefined area around the vehicle. In response to the proximity information, a detection instruction for detecting traffic signs and/or variable message traffic signs may be adapted and/or activated in order to improve a detection of a variable message traffic sign. In the step of varying a detection instruction, a detection instruction may be adapted and/or instead of the detection instruction another detection instruction may be carried out. If a variable message traffic sign is detected, information may be provided about the variable message traffic sign. A detection instruction may be understood as a method and/or an algorithm that carries out steps for identifying information of a variable message traffic sign or of a normal traffic sign.

Variable message traffic signs (VMS) are currently not generally standardized, especially as concerns the pulsing of the light sources (LEDs). It is therefore difficult to find an optimized method for all variants of variable message traffic signs, especially when at the same time the detection of other types of traffic signs is to be impaired as little as possible. Furthermore, variable message traffic signs may make up only a small portion of the actually existing traffic signs. Against the background of an efficient handling of computational resources, it is hardly possible to make a constant additional effort for detecting variable message traffic signs.

The presence of variable message traffic signs on a segment of road may now already be indicated in the digital maps of navigation devices. It is probable that this information may in the future make more detailed reference to the precise position of the variable message traffic signs, especially also to their elevation above the road surface, or that additional properties such as the possible pulsing frequencies may be provided. A database with GPS positions of known variable message traffic signs or other external information would also be conceivable. By utilizing this additional information about the proximity with respect to a variable message traffic sign and its expected properties, it is possible to adapt the algorithm of the detection unit or a method for detecting variable message traffic signs to these situations in an optimized fashion. Then it is in particular not necessary to find a compromise or it is necessary to find only a less far-reaching compromise between an optimized strategy for detecting sheet-metal traffic signs and for detecting variable message traffic signs. Furthermore, more complex solutions for variable message traffic signs are also possible if these only need to be applied in specific situations and not generally.

Moreover, in the step of comparing, it is possible for the position information of variable message traffic signs to be provided by a navigation device and at the same time or alternatively by a database. The position information may be stored in a database. The position information may be stored in a navigation device. The database may be associated with a navigation device. The database and at the same time or alternatively the navigation device may be situated in the vehicle. The database may be situated externally with respect to the vehicle and the method may access it wirelessly. Such a specific embodiment of the present invention offers the advantage of readily available position information such that little effort is required to receive this position information.

In one specific embodiment, the proximity information may include at least one additional property of the variable message traffic sign, in particular the precise position and/or elevation above the roadway and/or a pulsing frequency of the variable message traffic sign. The proximity information may include the precise position of the variable message traffic sign. The proximity information may include the elevation of the variable message traffic sign above the road surface. The proximity information may include the pulsing frequency of the LEDs of the variable message traffic sign. Advantageously, the detection instruction may be varied in response to the proximity information, in particular in response to the additional properties of the variable message traffic sign. For this purpose, information about the elevation of the variable message traffic sign above the road surface and/or about the precise position of the variable message traffic sign, in particular relative to the vehicle position, may be used to determine an image area, in which a variable message traffic sign is expected. The detection instruction may be adapted for the specific image area in order to improve the identification of a variable message traffic sign. This allows for a resource-conserving approach when implementing the method provided here.

It is also advantageous if in one specific embodiment, at least one setting of an image recording device is modified in response to the proximity information in the step of varying the detection instruction. In particular, global settings of an image recording device may be adapted or modified. For example, an exposure time may be adapted in response to the proximity information, i.e. decreased or increased. In proximity of a variable message traffic sign, global settings of an image recording device may be adapted. The image recording device may be configured to record a surroundings around the vehicle, in particular an area in front of the vehicle. If a variable message traffic sign is located in the predefined area around the vehicle, then the exposure time of the image recording device may be adapted. The exposure time of the image recording device may be increased in order to ensure the imaging of an illuminated phase of a pulsed light source of the variable message traffic sign. The exposure time may be generally adjusted. The exposure time may be specifically adapted for a variable message traffic sign in response to proximity information, in particular in response to a pulsing frequency of the variable message traffic sign. The pulsing frequency of the variable message traffic sign may be understood as a frequency with which a light source, in particular an LED, of the variable message traffic sign is activated in a pulsed manner. The pulsing frequency may be constant for a variable message traffic sign. Such a specific embodiment of the present invention offers the advantage that by simply modifying the parameters of the image recording unit it becomes possible readily to obtain an image that allows for a clear improvement of the detection result of the detection of a variable message traffic sign, particularly in comparison to conventional approaches.

In one specific embodiment, it is possible, in the step of varying the detection instruction, to activate a method for detecting variable message traffic signs in response to the proximity information. In the step of varying the detection instruction, it is possible in particular to register and jointly evaluate a plurality of images of an image recording. device. In the step of varying the detection instruction, it is possible in particular to register and jointly evaluate a plurality of images of an image recording device (for example by averaging pixel values jointly). If no variable message traffic sign is located in the predefined area around or in front of the vehicle, a standard method may be used to detect traffic signs. It is thus possible to use a special method for detecting variable message traffic signs in response to the proximity information, which has been optimized with respect to the evaluation of the special features of variable message traffic signs. Varying the detection instruction by switching the detection instruction advantageously makes it possible to save resources since a method for detecting variable message traffic signs, having often a higher consumption of resources than a standard method for detecting (invariable) traffic signs, is performed only when a variable message traffic sign is located in the predefined area around the vehicle.

Furthermore, it is also possible, in the step of varying the detection instruction, to parameterize a method for evaluating the image in response to the proximity information. By way of a parameterization in the step of varying the detection instruction, it is possible do adapt or modify at least one image area to be processed or to be evaluated. In the step of varying the detection instruction, an image area of the image recorded by the image recording unit may be selected in response to the proximity information. In the step of varying the detection instruction, at least one threshold value may be parameterized relative to the pulsing frequency of the variable message traffic sign. It is possible, for example, to adapt the exposure time in the process of recording the image in order to record at least one "on phase" or illuminated phase of the LED in case a pulsed LED is used as the light source of the variable message traffic sign. Furthermore, it is possible, in the step of varying the detection instruction, to parameterize a special method for detecting variable message traffic signs in response to the proximity information. Such a specific embodiment of the present invention offers the advantage of a particularly reliable detection of the content of the variable message traffic sign. Compared to a standard method, which is configured for detecting the content of an invariable traffic sign, such a re-parameterization offers the advantage of merely resetting individual parameters of this standard method, without requiring a time-consuming loading of a new algorithm.

It is also advantageous if another detection instruction of information of a variable message traffic sign is carried out in response to the proximity information in order to detect a variable message traffic sign. In response to the proximity information, a detection instruction and simultaneously or alternatively another detection instruction may be carried out in response to information provided from the image detection unit. Thus, an image area of an image of the image detection may be examined using a first detection instruction and another image area of the image of the image detection may be examined using the additional detection instruction (which advantageously differs from the first detection instruction). This offers the advantage that respectively a most suitable detection instruction may be applied to different image areas.

In other words, one specific embodiment is not concerned with the use of information regarding the precise type of sign or its possible contents, like for example a speed limit to 80 km/h, which information may also be contained the digital map. Depending on the specific embodiment, different possibilities of using this additional proximity information regarding the existence of variable message traffic signs or their properties are conceivable. In one specific embodiment, it is possible to perform camera-global adaptations in the proximity of variable message traffic signs. Generally and/or adapted to the expected pulsing frequencies of the at least one variable message traffic sign, it is possible for example to parameterize the camera control and especially the exposure time in a correspondingly favorable manner. In one specific embodiment, special methods for detecting variable message traffic signs may be activated in the proximity of variable message traffic signs, which are otherwise not used, such as for example registering multiple successive images and/or frames. In one specific embodiment, it is possible to parameterize suitably a special algorithm as well as the standard algorithm, that is, a method for detecting variable message traffic signs, as a function of additional properties of the variable message traffic signs, that is, in response to the proximity information. In particular, an adaptation of the processed image areas is conceivable as a function of the position of the variable message traffic signs or the parameterization of threshold values, for example, a threshold value of the exposure time relative to the pulsing.

The present invention furthermore creates a device for detecting variable message traffic signs for a vehicle, the device being configured to carry out or implement the steps of a variant of a method provided here for detecting variable message traffic signs for a vehicle in suitable devices. This embodiment variant of the present invention in the form of a device may likewise be used to achieve quickly and efficiently the objective on which the present invention is based.

In the present case, a device may be understood as an electrical device which processes sensor signals and outputs control signals and/or data signals as a function of the latter. The device may include an interface configured as hardware and/or software. In a hardware implementation, the interfaces may be part of a so-called system ASIC, for instance, which encompasses a wide variety of functionalities of the device. However, it is also possible for the interfaces to be separate, integrated circuits or to be at least partially made up of discrete components. In a development as software, the interfaces may be software modules which exist on a microcontroller, for example, alongside other software modules.

Also advantageous is a computer program product which has program code that may be stored on a machine-readable carrier such as a semiconductor memory, a hard-disk memory or an optical memory, and which is able to be used to implement the method according to one of the specific embodiments described above, when the program product is executed on a computer or a device.

In the following, the present invention will be explained in greater detail by way of example with reference to the attached drawings.

DETAILED DESCRIPTION

In the following description of exemplary embodiments of the present invention, identical or similar reference symbols are used for similarly acting elements shown in the various figures, a repeated description of these elements being omitted.

Figure 1:
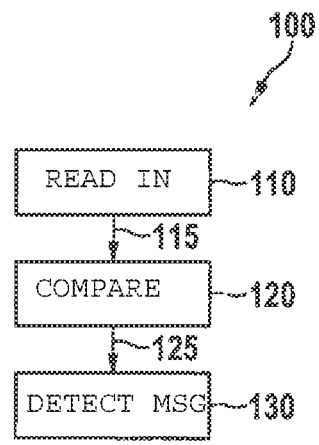
FIG. 1 a flow chart of a method according to one exemplary embodiment of the present invention.

FIG. 1 shows a flow chart of a method 100 according to one exemplary embodiment of the present invention. The method 100 for detecting variable message traffic signs for a vehicle includes a step 110 of reading in a vehicle position 115, a step 120 of comparing the vehicle position 115 to position information of at least one variable message traffic sign and a step 130 of varying a detection instruction of information of a variable message traffic sign. The vehicle position 115 is read in in step 110 of reading in a vehicle position 115. Vehicle position 115 may be read in at an interface, at which the vehicle position 115 is provided by a navigation system for example. In step 120 of comparing vehicle position 115 to position information of at least one variable message traffic sign, vehicle position 115 is compared to position information of at least one variable message traffic sign in order to determine a presence of variable message traffic sign in a predefined area around the vehicle. For this purpose, at least one item of position information of at least one variable message traffic sign may be read in in the step 110 of reading in. In another exemplary embodiment, in step 120 of comparing, at least one item of position information of at least one variable message traffic sign in a predefined area around the vehicle is searched in a database in response to the vehicle position 115 read in in step 110 of reading in. Step 120 of comparing provides proximity information 125. In step 130 of varying a detection instruction of information of a variable message traffic sign, a variable message traffic sign is detected in response to proximity information 125. The shown method 100 allows for the detection of variable message traffic signs with the aid of external information.

Figure 2:
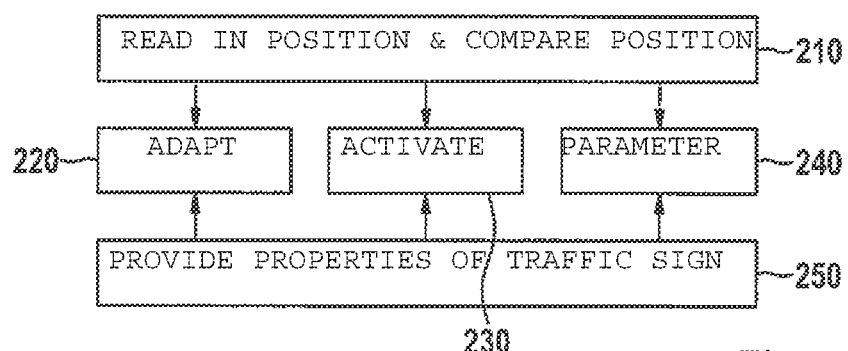
FIG. 2 a flow chart of an alternative method according to one exemplary embodiment of the present invention.

FIG. 2 shows an alternative flow chart of a method according to one exemplary embodiment of the present invention. In a step 210, the proximity with respect to a variable message traffic sign is detected. In the method for detecting variable message traffic signs for a vehicle shown in FIG. 1, step 210 includes step 110 of reading in a vehicle position 115 and step 120 of comparing the vehicle position 115 to an item of position information of at least one variable message traffic sign. Step 210 of detecting a proximity with respect to a variable message traffic sign outputs proximity information. Global settings are adapted in a step 220. A global setting may be understood as a setting that is taken into account in all situations when recording an image. A special algorithm is activated in a step 230. In a step 240, a standard algorithm is parameterized. Steps 220, 230, 240 correspond to variants and/or options of step 130 of varying a detection instruction of information of a variable message traffic sign shown and described in FIG. 1. Steps 220, 230, 240 may be performed alternatively with respect to one another and/or simultaneously. The proximity information output by step 210 of detecting a proximity with respect to a variable message traffic sign is received by one and/or several of steps 220, 230, 240. The flow chart shown in FIG. 2 has an optional step 250 of providing properties of the at least one variable message traffic sign. The proximity information is enriched in this step. This optional step 250 represents an optional extension of step 120 of comparing the vehicle position to an item of position information of at least one variable message traffic sign described in FIG. 1.

Figure 3:
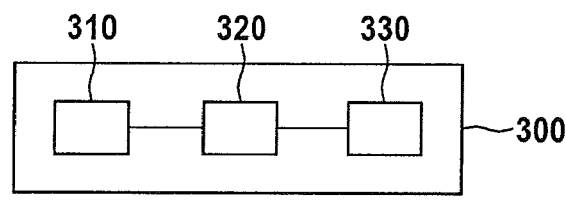
FIG. 3 a block diagram of a device according to one exemplary embodiment of the present invention.

FIG. 3 shows a block diagram of a device 300 for detecting variable message traffic signs for a vehicle according to an exemplary embodiment of the present invention. Device 300 has a device 310 for reading in a vehicle position. Device 310 for reading in a vehicle position has an interface in order to read in the vehicle position. Device 300 has a device 320 for comparing the vehicle position to position information of at least one variable message traffic sign in order to determine a presence of a variable message traffic sign in a predefined area around the vehicle and to provide in response an item of proximity information. Device 300 has a device 330 for varying a detection instruction of information of a variable message traffic sign in response to the proximity information in order to detect a variable message traffic sign. The shown device 300 for detecting variable message traffic signs for a vehicle may have an improved detection performance of variable message traffic signs under comparable conditions in positions for which GPS or map information exists than in positions for which no position information about variable message traffic signs exists.

Figure 4:
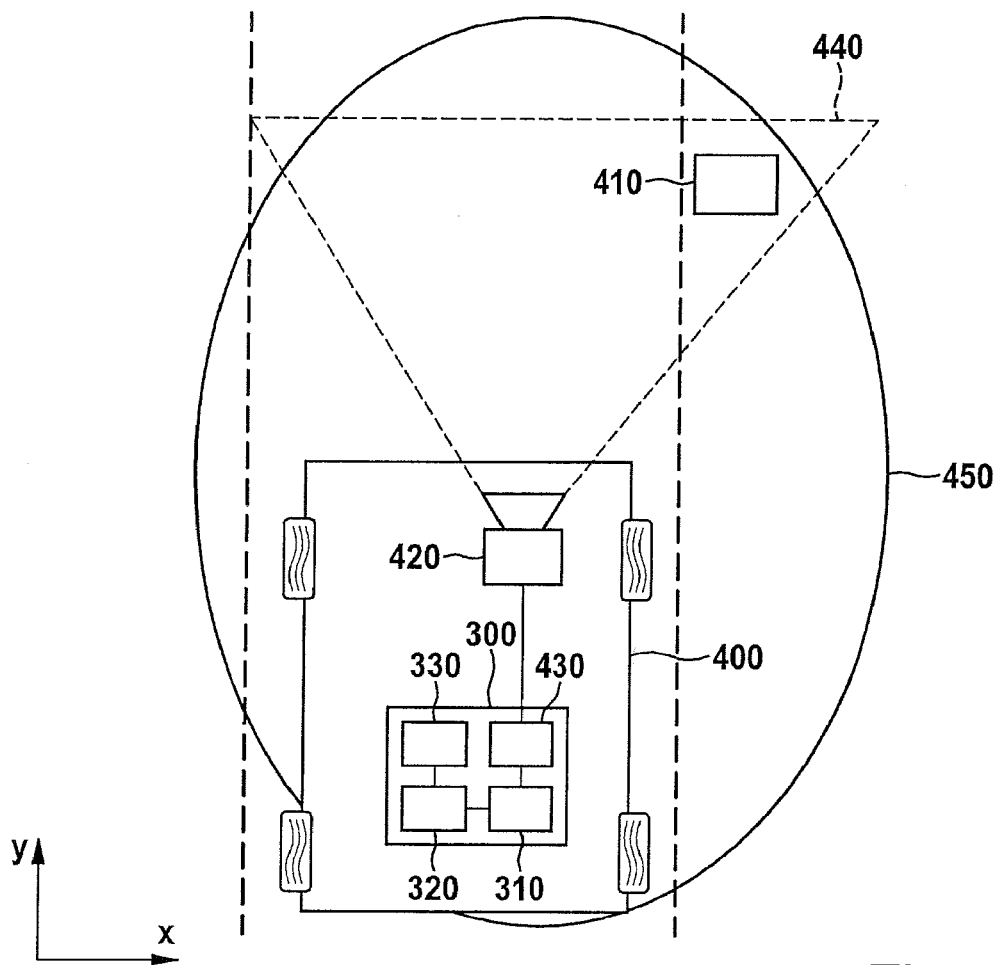
FIG. 4 a basic representation of a vehicle driving toward a variable message traffic sign, an exemplary embodiment of the present invention being installed in the vehicle as a device.

FIG. 4 shows a schematic representation of a vehicle 400 having a device 300 for detecting variable message traffic signs 410 according to an exemplary embodiment of the present invention. Device 300 for detecting variable message traffic signs 410 may be the device for detecting variable message traffic signs 410 shown in FIG. 3. Aside from device 300 for detecting variable message traffic signs 410, vehicle 400 has an image recording device 420. Image recording device 420 is connected to device 300 for detecting variable message traffic signs 410 via an interface 430. Device 300 for detecting variable message traffic signs 410 is configured to receive image information of image recording device 420 via interface 430. Device 300 has a device 310 for reading in a vehicle position. Device 300 has a device 320 for comparing the vehicle position to position information of at least one variable message traffic sign in order to provide proximity information. Device 300 has a device 330 for varying a detection instruction of information of a variable message traffic sign in response to the proximity information in order to detect a variable message traffic sign. Image recording device 410 is configured to record image information of a detecting area 440. A predefined area 450 is defined around vehicle 400. Detection area 440 covers at least one part of predefined area 450. Vehicle 400 has a device for determining the vehicle position as well as at least one item of position information of at least one variable message traffic sign 410 in order to determine a presence of a variable message traffic sign 410 in predefined area 450 around vehicle 400.

If vehicle 400 now drives toward variable message traffic sign 410 for example (i.e. in the y direction as shown in FIG. 4), then device 310 for reading in the vehicle position is able to detect this. This device 310 may have a receiver of a satellite positioning system for example and may infer the current geographical position from a signal of this receiver. Now, if on the basis of this signal of the receiver, the device for comparison 320 detects by a comparison that the geographical position is located within the predefined area 450, which also includes a geographical position of variable message traffic sign 410, then the aforementioned proximity information may be output. The geographical position of variable message traffic sign 410 may be read out from a database for example, which is contained either in device 310 for reading in the vehicle position or which may be accessed via a mobile radio connection. At the same time, aside from the variable message traffic sign 410, at least one additional parameter of variable message traffic sign 410, for example of a pulse duration of light sources of variable message traffic sign 410, of an elevation of variable message traffic sign 410 above the road surface or a position of the variable message traffic sign 410 adjacent to the roadway may be read out as additional information or additional parameters. When the geographical position or additional parameters of variable message traffic sign 410 are stored outside of vehicle 400 and the geographical position or the additional parameter of variable message traffic sign 410 are retrieved via the mobile radio connection, it is possible to ensure that these data are very current.

If the system now detects that variable message traffic sign 410 is located in proximity to vehicle 400, that is, if it is located in predefined area 450, then this indication may be communicated by the proximity information to a corresponding device 330 for varying a detection instruction. In this device 330 for varying the detection instruction for detecting the content of a traffic sign may be modified so that particularly the content of a variable message traffic sign 410 may be detected particularly well. For example, such modification or variation of the detection instruction may include the modification of a control parameter for a camera 420 in such a way that camera 420 scans a surroundings of vehicle 400 using a different exposure time, for example a longer exposure time. This makes it possible, in the case of pulsed light sources of variable message traffic sign 410, to scan variable message traffic sign 410 with greater reliability during the recording time window of camera 420 also at a point in time at which the light sources of variable message traffic sign 410 are switched on. Alternatively or additionally, the detection algorithm may be modified in such a way that in an image of camera 420 particularly the image area corresponding to another parameter from the proximity information may be analyzed particularly by using an algorithm configured for detection within a variable message traffic sign. For example, an image area representing a certain elevation above the road surface and/or a certain area next to the roadway may be evaluated by using a detection algorithm optimized for detecting a content of a variable message traffic sign 410, whereas another image area of the image recorded by camera 420 is evaluated by using a standard detection algorithm that is optimized for invariable traffic signs. Such a procedure makes it possible that detection algorithms that are costly to implement numerically and in terms of circuit engineering only need to be used in small image areas or only in certain situations, that is, within certain (short) time spans, which makes it possible to conserve available numerical and circuit-engineering resources. It is likewise conceivable to modify a detection algorithm in such a way that multiple images recorded in succession by camera 420 (for example three or five images) are superposed and that the resulting superposed image is evaluated further in order to detect a content within variable message traffic sign 410. Such a superposition may be achieved for example by averaging brightness values of pixels from different images, which correspond to the same local positions. The superposed image then includes on the individual pixels respectively the brightness values averages from the different superposed images.

Altogether, by taking into account a known position of an variable message traffic sign 410 and/or additional parameters for this variable message traffic sign 410, it is thus possible to implement a simplification of the traffic sign evaluation in vehicle 400. This makes it possible to use resources freed up by the simplification for other functions in vehicle 400, which makes it possible for example to increase further a vehicle safety or a comfort while vehicle 400 is traveling.

The exemplary embodiments described and shown in the figures have been selected merely as examples. Different exemplary embodiments are combinable with one another, either completely or with regard to individual features. An exemplary embodiment may also be supplemented by features from another exemplary embodiment.

Furthermore, method steps according to the present invention may be carried out repeatedly and also performed in a sequence other than the one described.

If an exemplary embodiment includes an "and/or" linkage between a first feature and a second feature, this is to be understood to mean that the exemplary embodiment according to one specific embodiment has both the first feature and the second feature, and according to another specific embodiment, either has only the first feature or only the second feature.

What is claimed is:

1. A method for detecting variable message traffic signs of a vehicle, the method comprising:

reading in a vehicle position;
comparing the vehicle position to position information of at least one variable message traffic sign to determine a presence of a variable message traffic sign in a predefined area around the vehicle and in response to provide proximity information; and
varying an instruction for detecting information of a variable message traffic sign in response to the proximity information to detect the variable message traffic sign;
wherein pulsed LED light sources of the at least one variable message traffic sign are operated at a frequency which is not perceptible to the human eye, so that an off phase of a pulsing may fall into a recording time window so that the at least one variable message traffic sign is only partially detectable or not detectable in the image,
wherein the varying includes modifying a control parameter for a camera so that the pulsed LED light sources of the at least one variable message traffic sign are scanned during a recording time window of the camera at a point in time at which the pulsed LED light sources are switched on,
wherein in the comparing, the position information of variable message traffic signs is provided by a navigation device and/or by a data base, and
wherein the proximity information includes at least one additional property of the variable message traffic sign, in particular the precise position and/or elevation above the road surface and/or a pulsing frequency of the variable message traffic sign.

2. The method of claim 1, wherein in the varying the detection instruction in response to the proximity information, at least one setting of an image recording device is modified.

3. The method of claim 1, wherein in the varying the detection instruction in response to the proximity information, a process for detecting variable message traffic signs is activated.

4. The method of claim 1, wherein in the varying the detection instruction in response to the proximity information, a process for image evaluation is parameterized.

5. The method of claim 1, wherein in response to the proximity information, another detection instruction for information of a variable message traffic sign is implemented to detect a variable message traffic sign.

6. The method of claim 1, wherein in the varying the detection instruction in response to the proximity information, at least one setting of an image recording device is modified, in particular global settings of the image recording device.

7. The method of claim 1, wherein in the varying the detection instruction in response to the proximity information, at least one setting of an image recording device is modified, in particular global settings of the image recording device, in particular an exposure time.

8. The method of claim 1, wherein in the varying the detection instruction in response to the proximity information, a process for detecting variable message traffic signs is activated, in particular a registration and/or evaluation of a plurality of successive images of an image recording device being initiated.

9. The method of claim 1, wherein in the varying the detection instruction in response to the proximity information, a process for image evaluation is parameterized, in particular a modification of at least one image area to be processed and/or a parameterization of at least one threshold value relative to the pulsing frequency of the variable message traffic sign.

10. A device for detecting variable message traffic signs of a vehicle, comprising:
    a reading device to read in a vehicle position;
    a comparing device to compare the vehicle position to position information of at least one variable message traffic sign to determine a presence of a variable message traffic sign in a predefined area around the vehicle and in response to provide proximity information; and
    a varying device to vary an instruction to detect information of a variable message traffic sign in response to the proximity information to detect the variable message traffic sign;
    wherein pulsed LED light sources of the at least one variable message traffic sign are operated at a frequency which is not perceptible to the human eye, so that an off phase of a pulsing may fall into a recording time window so that the at least one variable message traffic sign is only partially detectable or not detectable in the image,
    wherein the varying includes modifying a control parameter for a camera so that the pulsed LED light sources of the at least one variable message traffic sign are scanned during a recording time window of the camera at a point in time at which the pulsed LED light sources are switched on,
    wherein in the comparing, the position information of variable message traffic signs is provided by a navigation device and/or by a data base, and
    wherein the proximity information includes at least one additional property of the variable message traffic sign, in particular the precise position and/or elevation above the road surface and/or a pulsing frequency of the variable message traffic sign.

11. A non-transitory computer readable medium having a computer program, which is executable by a processor, comprising:
    a program code arrangement having program code for detecting variable message traffic signs of a vehicle, by performing the following:
        reading in, via a reading device, a vehicle position;
        comparing, via a comparing device, the vehicle position to position information of at least one variable message traffic sign to determine a presence of a variable message traffic sign in a predefined area around the vehicle and in response to provide proximity information; and
    varying, via a varying device, an instruction for detecting information of a variable message traffic sign in response to the proximity information to detect the variable message traffic sign;
    wherein pulsed LED light sources of the at least one variable message traffic sign are operated at a frequency which is not perceptible to the human eye, so that an off phase of a pulsing may fall into a recording time window so that the at least one variable message traffic sign is only partially detectable or not detectable in the image, and
    wherein the varying includes modifying a control parameter for a camera so that the pulsed LED light sources of the at least one variable message traffic sign are scanned during a recording time window of the camera at a point in time at which the pulsed LED light sources are switched on,
    wherein in the comparing, the position information of variable message traffic signs is provided by a navigation device and/or by a data base, and
    wherein the proximity information includes at least one additional property of the variable message traffic sign, in particular the precise position and/or elevation above the road surface and/or a pulsing frequency of the variable message traffic sign.

* * * * *